(12) United States Patent
Benson et al.

(10) Patent No.: US 7,679,046 B1
(45) Date of Patent: Mar. 16, 2010

(54) INFRARED CAMERA CALIBRATION SYSTEMS AND METHODS

(75) Inventors: Robert G. Benson, New Ipswich, NH (US); Paul A. Czerepuszko, Hopkinton, MA (US)

(73) Assignee: FLIR Systems, Inc., Wilsonville, OR (US)

( * ) Notice: Subject to any disclaimer, the term of this patent is extended or adjusted under 35 U.S.C. 154(b) by 0 days.

(21) Appl. No.: 11/868,779

(22) Filed: Oct. 8, 2007

(51) Int. Cl.
*G12B 13/00* (2006.01)
*G01J 5/02* (2006.01)

(52) U.S. Cl. .................................... 250/252.1; 250/343
(58) Field of Classification Search ............. 250/252.1, 250/343
See application file for complete search history.

(56) References Cited

U.S. PATENT DOCUMENTS

| | | | | |
|---|---|---|---|---|
| 3,878,107 A | * | 4/1975 | Pembrook et al. | 250/343 |
| 4,991,007 A | * | 2/1991 | Corley | 348/188 |
| 5,083,204 A | * | 1/1992 | Heard et al. | 348/164 |
| 5,381,349 A | * | 1/1995 | Winter et al. | 382/167 |
| 5,585,635 A | * | 12/1996 | Graham | 250/343 |
| 5,731,583 A | * | 3/1998 | Bailey et al. | 250/343 |
| 7,057,641 B2 | * | 6/2006 | Bodnar et al. | 348/188 |
| 2002/0023022 A1 | * | 2/2002 | Miyashita | 705/26 |
| 2006/0268131 A1 | * | 11/2006 | Cutler | 348/239 |
| 2007/0034792 A1 | * | 2/2007 | Zhang et al. | 250/252.1 |
| 2007/0120058 A1 | * | 5/2007 | Blackwell et al. | 250/338.1 |

* cited by examiner

*Primary Examiner*—David P Porta
*Assistant Examiner*—Yara B Green
(74) *Attorney, Agent, or Firm*—Haynes and Boone, LLP

(57) ABSTRACT

Systems and methods are disclosed herein to provide infrared camera systems and infrared camera calibration techniques in accordance with one or more embodiments of the present invention. For example in accordance with an embodiment, a method of calibrating an infrared camera includes capturing video images of a calibration vessel having one or more chambers filled with a gas; displaying the video images from the capturing; and adjusting settings of the infrared camera such that colors of the displayed video images of the one or more chambers approximately match predetermined colors of one or more corresponding sections of a video overlay.

22 Claims, 4 Drawing Sheets

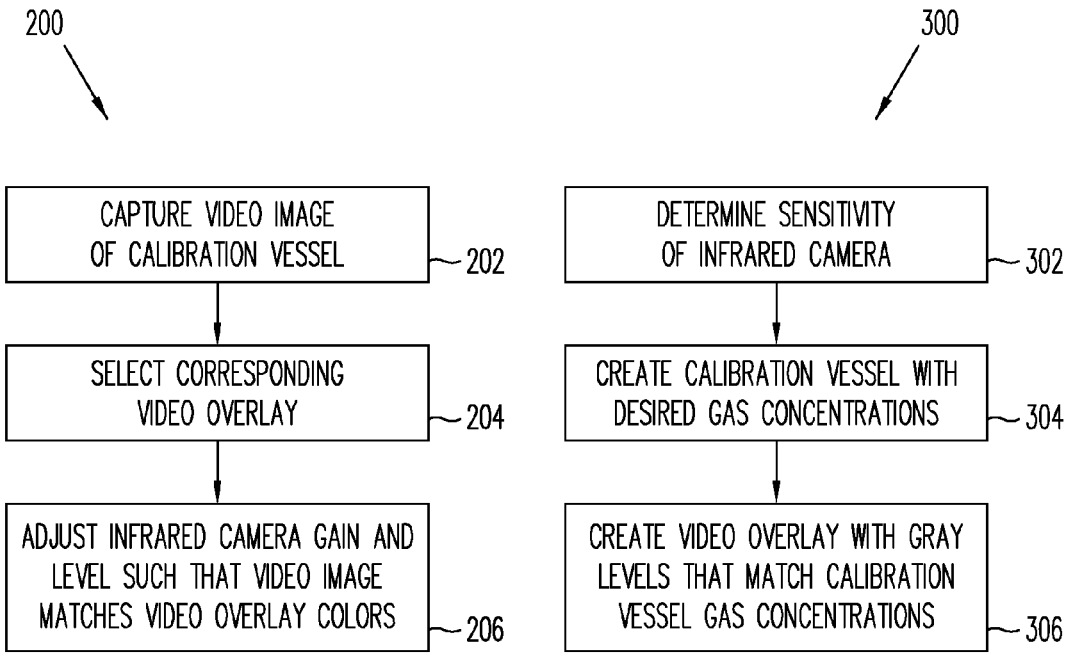
FIG. 2
FIG. 3
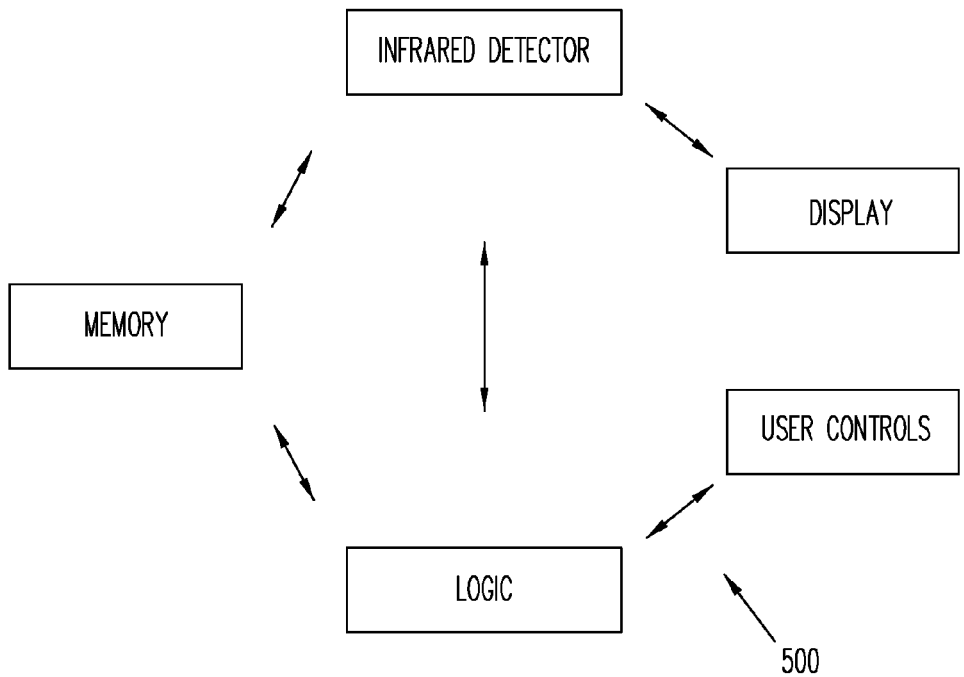
FIG. 5

US 7,679,046 B1

INFRARED CAMERA CALIBRATION SYSTEMS AND METHODS

TECHNICAL FIELD

The present invention relates generally to infrared cameras and, more particularly, to infrared camera calibration techniques.

BACKGROUND

Infrared cameras are used in a wide variety of applications. For example, an infrared camera may be used to observe a gas (e.g., any type of chemical) detectable in the infrared spectrum, which may be invisible to a person viewing the same scene solely with the naked eye (e.g., the gas is invisible in the visible spectrum).

A drawback of a conventional infrared camera that may be used to observe a gas is that various camera settings may need to be made by a user to calibrate the infrared camera to detect the gas. For example, if the infrared camera is being used to detect a particular gas (or certain types of gases), such as to detect for a gas leak, it may be difficult to determine if the infrared camera is properly calibrated to detect the particular gas (e.g., if no gas leaks are detected, are there really no gas leaks or are gas leaks present but not detected due to a user's erroneous infrared camera settings).

As a result, there is a need for improved calibration techniques for infrared cameras.

SUMMARY

Systems and methods are disclosed herein to provide infrared camera systems and infrared camera calibration techniques in accordance with one or more embodiments of the present invention. For example in accordance with an embodiment, an infrared camera calibration technique is disclosed that allows a user to calibrate the infrared camera to a particular gas (or gases) that the user desires to detect. Consequently, proper infrared camera calibration may be performed and a user may proceed to use the infrared camera with the knowledge that the infrared camera is able to detect the particular gas based on the calibration performed.

More specifically in accordance with one embodiment of the present invention, an infrared camera system includes an infrared camera adapted to provide infrared image data and having adjustable camera settings; a display, coupled to the infrared camera, adapted to receive the infrared image data; a calibration vessel having one or more chambers containing a gas; and a video overlay having one or more sections corresponding to the one or more chambers, wherein the sections provide proper colors for calibrating the infrared camera to detect the gas by adjusting the camera settings such that colors of the infrared image data from the infrared camera of the one or more chambers as shown on the display approximately match the proper colors of the corresponding sections.

In accordance with another embodiment of the present invention, a calibration vessel includes a housing; a plurality of chambers within the housing, wherein the chambers contain a gas, with each chamber having a different concentration of the gas; and an infrared passband window, coupled to the housing, adapted to allow infrared radiation traveling through the chambers to be received by an infrared camera external to the calibration vessel, wherein the calibration vessel serves as a calibration tool for the infrared camera.

In accordance with another embodiment of the present invention, a method of calibrating an infrared camera includes capturing video images of a calibration vessel having one or more chambers filled with a gas; displaying the video images from the capturing; and adjusting settings of the infrared camera such that colors of the displayed video images of the one or more chambers approximately match predetermined colors of one or more corresponding sections of a video overlay.

In accordance with another embodiment of the present invention, a method of making a calibration system for an infrared camera includes determining a sensitivity of the infrared camera to a particular gas; creating a calibration vessel having a plurality of chambers; and filling the chambers with different concentrations of the particular gas, wherein the concentrations are based on the determining and are selected to provide discernible color differences when viewed with the infrared camera.

In accordance with another embodiment of the present invention, an infrared camera includes a housing; an infrared detector coupled within the housing; a memory coupled within the housing, the memory adapted to store a video overlay corresponding to a gas; and a display adapted to receive from memory the video overlay for a user of the infrared camera to view along with infrared image data from the infrared detector of a calibration vessel containing one or more chambers filled with the gas, wherein setting adjustments of the infrared camera to approximately match colors of the displayed infrared image data of the calibration vessel to colors of the corresponding displayed video overlay calibrates the infrared camera to detect the gas.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 2 shows a flowchart illustrating an example of a user calibration process for the infrared camera system of FIG. 1 in accordance with an embodiment of the present invention.

FIG. 3 shows a flowchart illustrating an example of a calibration process and system development, such as for the infrared camera of FIG. 1 in accordance with an embodiment of the present invention.

FIG. 5 shows a block diagram illustrating an infrared camera in accordance with an embodiment of the present invention.

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
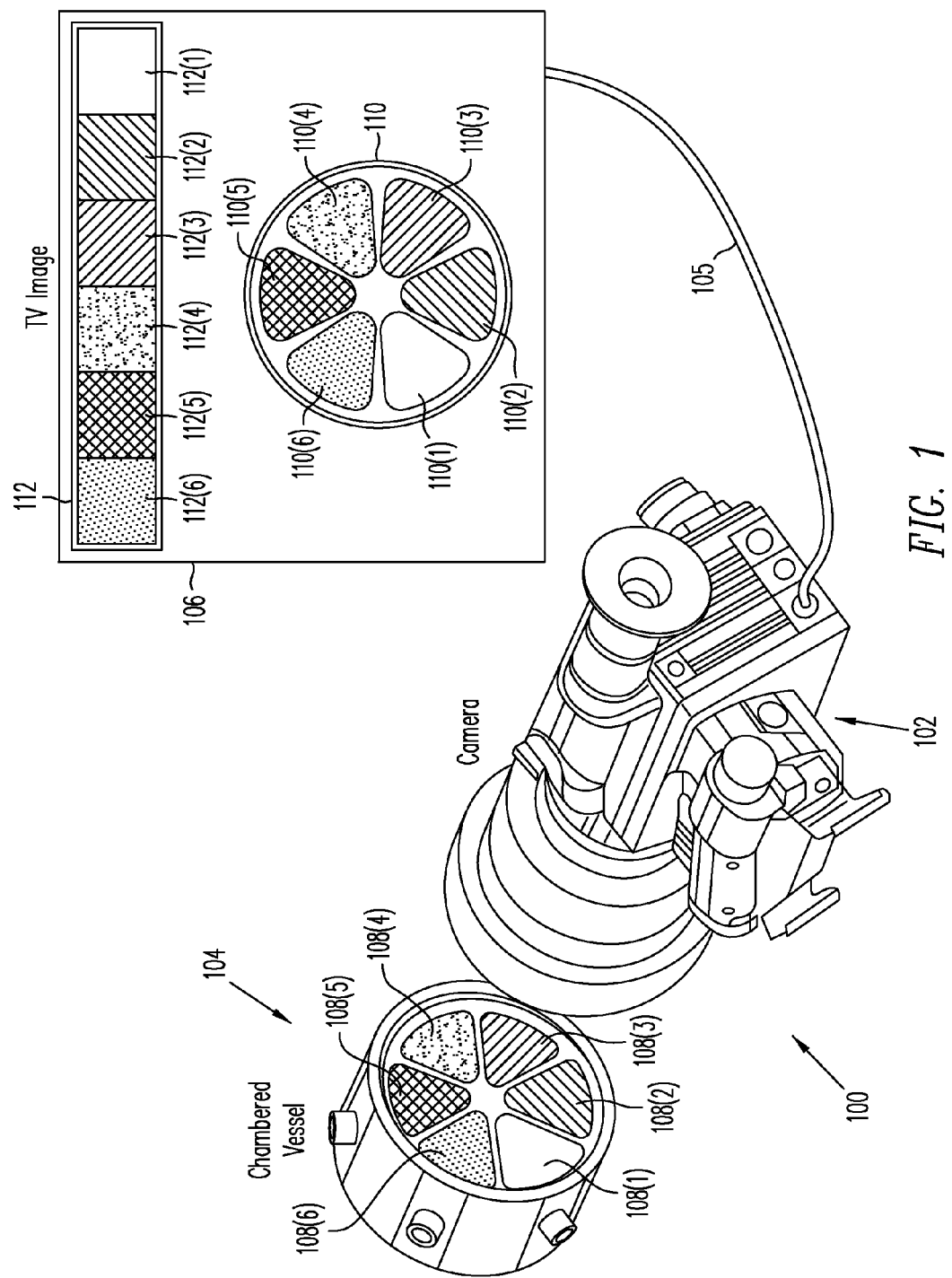
FIG. 1 shows a diagram illustrating an infrared camera system in accordance with an embodiment of the present invention.

FIG. 1 shows a diagram illustrating an infrared (IR) camera system 100 in accordance with an embodiment of the present invention. IR camera system 100 includes an infrared camera 102, a calibration vessel 104, and a display 106.

IR camera 102 may represent any type of infrared camera. For example, IR camera 102 may include an infrared detector, optics (e.g., an infrared window, an infrared filter, and/or an infrared lens), a viewfinder, user controls, and electronics (e.g., a processor or other type of logic device and memory for storing software and other information) for monitoring, acting upon commands (e.g., received via user controls), and for providing proper operation of IR camera 102.

For example referring briefly to FIG. 5, a general block diagram of an IR camera 500 is illustrated in accordance with an embodiment of the present invention. As shown generally and as would be understood by one skilled in the art, IR camera 500 may represent general functional features of an IR camera (e.g., IR camera 102). For example, IR camera 500 includes (e.g., within or coupled to a housing) an IR detector, memory, logic, a display, and user controls, which interact appropriately to provide desired IR camera functionality. As a specific example, IR camera 102 or 500 may represent the ThermaCAM® GasFindIR IR camera manufactured by FLIR Systems, Inc (headquartered in Wilsonville, Oreg.). However, it should be understood that this is not limiting and that generally any type of infrared camera may be used for performing the calibration techniques, as discussed further herein.

Returning to FIG. 1, Display 106 may represent any type of display (e.g., cathode ray tube, liquid crystal display, plasma display, etc.) that may be used to view images from IR camera 102. Display 106 may be incorporated as part of IR camera 102 (e.g., IR camera 102 manufactured with display 106) or may be separate from IR camera 102, with display 106 coupled (or couplable) to IR camera 102 via a video cable 105 in a conventional fashion. Alternatively as an example, display 106 may represent what would be shown by a user of IR camera 102 during the calibration process, as viewed by the user through the viewfinder or other type of conventional display of IR camera 102.

Calibration vessel 104 may represent a calibration instrument for performing a calibration of IR camera 102. For example, calibration vessel 104 may represent a chambered vessel for containing individual chambers 108 filled with one or more types and/or concentrations of gases.

As a specific example, calibration vessel 104 may include various concentrations of methane (CH4) in chambers 108 (e.g., chambers 108(2) through 108(6)). For example, chamber 108(2) through 108(6) may enclose relatively increasing higher concentrations of methane, with chamber 108(2) having the lowest concentration of methane and chamber 108(6) having the highest concentration of methane. Furthermore for this example, chamber 108(1) may enclose a different type of gas (e.g., no methane), such as nitrogen (N2), and thus calibration vessel 104 may include one concentration of nitrogen and five different concentrations of methane.

However, this is not limiting and, as explained further herein, the configuration of calibration vessel 104 (e.g., size, shape, number of chambers 108, etc.) and/or the type of gases contained within calibration vessel 104 are not limiting. Furthermore in general, the term "gas" may refer herein to any type of gas (e.g., a chemical or substance in any form, including a solid or a liquid state), such as methane, propane, hydrogen, carbon monoxide, ammonia, hydrogen sulfide, alcohol, toluene, xylene, refrigerant gases, and/or other volatile organic compounds (VOCs). Thus, the term "gas" is used generally herein to denote some substance that may be detectable in the infrared spectrum.

In accordance with one or more embodiments, IR camera 102 may be calibrated for a particular gas (or gases) by using calibration vessel 104. For example, FIG. 2 shows a flowchart 200 illustrating an example of a user calibration process for IR camera system 100 of FIG. 1 in accordance with an embodiment of the present invention. In general, a user may direct IR camera 102 towards calibration vessel 104 (block 202) to obtain a video image 110 on display 106 (FIG. 1). For example, video image 110 shows video images 110(1) through 110(6), which correspond respectively to chambers 108(1) through 108(6) of calibration vessel 104.

A video overlay 112 is provided having one or more sections corresponding to one or more chambers 108, with the sections displaying the proper color (e.g., shade of gray) for the particular chambers 108. For example, video overlay 112 is shown with video overlay sections 112(1) through 112(6) that correspond to chambers 108(1) through 108(6).

As an example, one or more video overlays 112 may be available, depending upon the type of gas or corresponding calibration vessel 104, which a user may select (block 204). The video overlays 112 may be stored in memory of IR camera 102 and selectable for display on display 106 along with the video image of calibration vessel 104, as shown in FIG. 1. Alternatively, video overlays 112 may be discrete items (e.g., display screen overlays) that may be placed by the user on display 106. In general as an example, a library of video overlays 112 may be provided for either example (e.g., for video overlays 112 stored in memory or available for placement onto display 106) that may be selected for the corresponding calibration vessel 104 (e.g., type of gas).

A user viewing display 106 may then adjust one or more camera settings of IR camera 102 until the colors of video image 110 visually match the colors provided by video overlay 112 (block 206). For example, a user may adjust a gain (e.g., contrast) and/or a level (e.g., brightness) settings of IR camera 102 until the colors (e.g., shades of gray) for video images 110(1) through 110(6) shown on display 106 match the proper colors provided by video overlay sections 112(1) through 112(6).

Thus for example, upon completion of the calibration process of flowchart 200, IR camera 102 may be viewed as being calibrated based on calibration vessel 104 and video overlay 112. Furthermore, IR camera 102 has demonstrated its ability to detect the gas (or gases) contained in calibration vessel 104, with a user of IR camera 102 then able to proceed with gas leak detection or other gas detection applications knowing that IR camera 102 is calibrated and able to detect the gas, if present.

As noted herein, video overlays 112 may be provided based on calibration vessel 104, the type of gases contained in calibration vessel 104, and the particular type of IR camera 102. For example, FIG. 3 shows a flowchart 300 illustrating an example of a calibration process for IR camera 102 of FIG. 1 in accordance with an embodiment of the present invention. Flowchart 300 may be performed, for example, by a manufacturer of IR camera 102, calibration vessel 104, and/or video overlay (or other third party). For example, the calibration process of flowchart 300 or portions of flowchart 300 may be used to create video overlays and corresponding calibration vessels for various types of gases for a particular IR camera product line.

For flowchart 300, a sensitivity of IR camera 102 is determined (block 302) for a particular gas. The sensitivity may be determined, as an example, based on gas concentration to output signal for IR camera 102. Specifically for example, a test may be performed to determine the minimum detectable concentration of gas that could be detected by IR camera 102, which allows a mapping for that minimum detectable concentration to an output video signal level (e.g., in millivolts), as would be understood by one skilled in the art. Thus as an example, based on the signal-to-noise value of IR camera 102 for that minimum detectable concentration, any detectable gas concentration level may be used to check and calibrate the sensitivity of IR camera 102. For a calibration vessel and/or video overlay manufacturer, the IR camera sensitivity, for example, may be determined based upon information provided by the IR camera manufacturer.

A calibration vessel (e.g., calibration vessel 104) may then be created with the desired gas concentrations (block 304). The calibration vessel may contain one or more chambers for one or more concentrations of gas. For example, calibration vessel 104 may provide five different methane concentrations and one concentration of nitrogen. The nitrogen gas, for this specific example, may be selected as a zero point reference (e.g., provides a white video reference level for video image 110(1) for comparison to video overlay section 112(1)). However, it should, be understood that for the type of gas selected (e.g., methane or other gas) for infrared camera calibration, a different type of gas may be selected (e.g., other than nitrogen) to provide a desired zero point reference, as would be understood by one skilled in the art.

The methane gas concentrations (e.g., chambers 108(2) through 108(6)), for this specific example, may be selected to provide color levels that are easily discernible (e.g., clearly discerned gradations of the 256 gray levels) by a user viewing display 106 relative to video overlay 112 and performing the settings adjustments (e.g., as described for block 206 of FIG. 2). The highest methane concentration (e.g., chamber 108(6)) may be selected, for example, to provide a completely black video level, in contrast to the white video level provided by the nitrogen gas (e.g., chamber 108(1)). In general, the remaining chambers 108 may be filled with various methane concentrations based on the known output video signal level corresponding to a known methane concentration (e.g., as determined in block 302).

A video overlay (e.g., video overlay 112) may be created having proper color levels (e.g., gray levels) to correspond with the one or more chambers of the calibration vessel (block 306). As a specific example, FIG. 1 illustrates video overlay 112 having six video overlay sections 112(1) through 112(6) that provide the proper gray levels to calibrate to for the corresponding six chambers 108(1) through 108(6) of calibration vessel 104, as discussed herein.

Figure 4A:
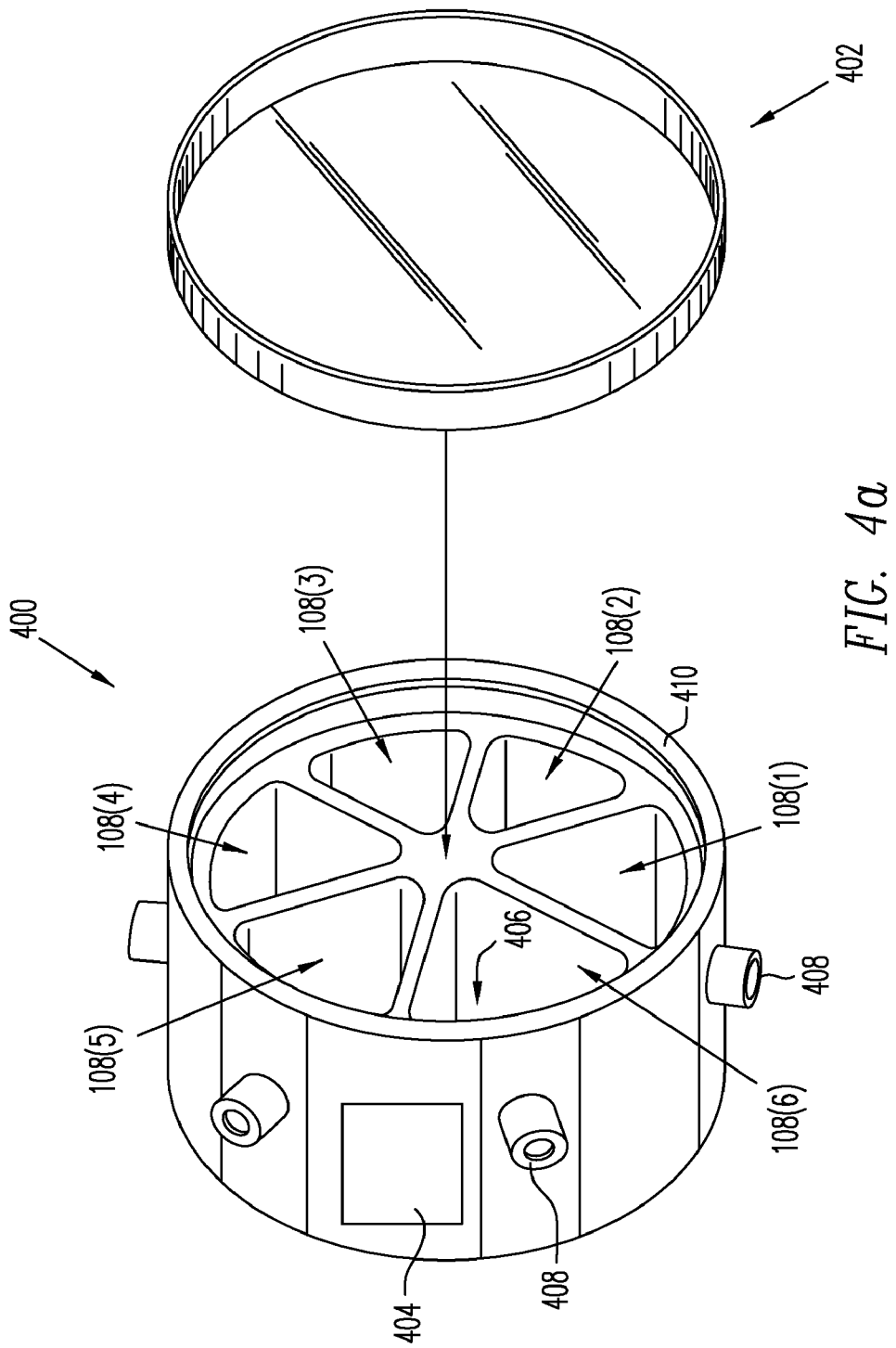
FIGS. 4a-4c show diagrams illustrating specific implementations of calibration vessels and/or video overlays for the infrared camera system of FIG. 1 in accordance with an embodiment of the present invention.
Figure 4B:
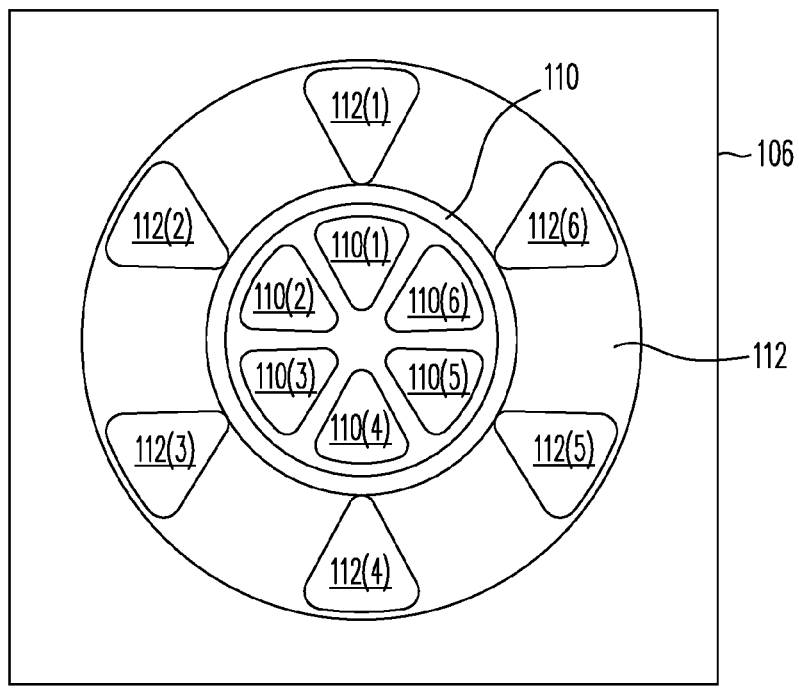
Figure 4C:
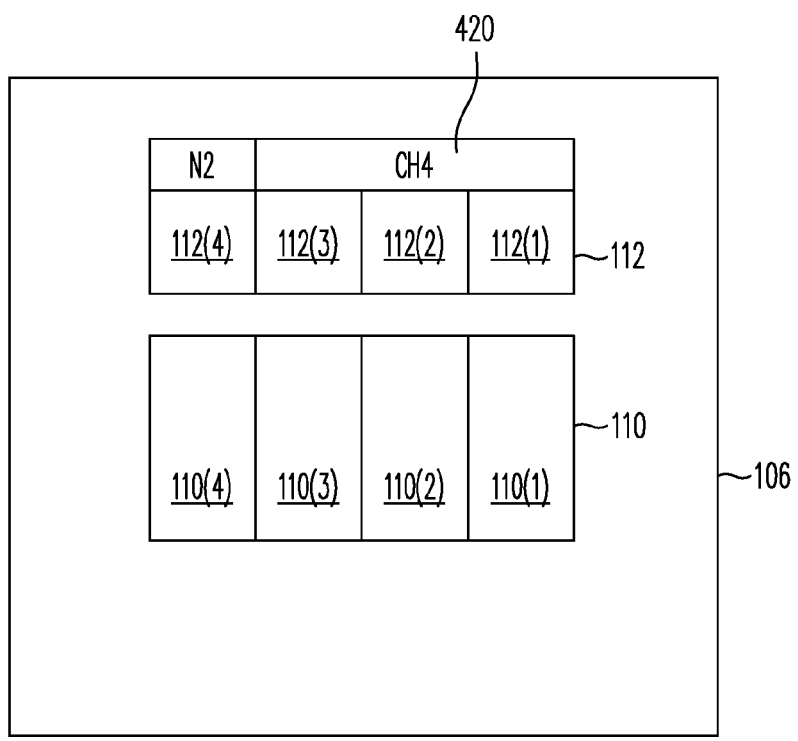

It should be understood that calibration vessel 104 and video overlay 112 may be provided in various configurations. For example, FIGS. 4a-4c show diagrams illustrating specific implementations of calibration vessels and/or video overlays for IR camera system 100 of FIG. 1 in accordance with an embodiment of the present invention. Specifically, FIG. 4a illustrates a specific implementation of a calibration vessel 400 (e.g., a specific implementation example of calibration vessel 104 of FIG. 1) in accordance with an embodiment of the present invention. Calibration vessel 400 may optionally include an IR passband window 402, which may be affixed to a front surface of calibration vessel 400 as illustrated. For example, IR passband window 402 may have a passband corresponding to the particular gas within calibration vessel 400, as would be understood by one skilled in the art.

Calibration vessel 400, for example, may be made of metal or other suitable vessel material and may have a black anodized inner surface 406 (e.g., a blackbody). For example, surface 406 (e.g., the rear inner surface of calibration vessel 400) may provide infrared emissions which pass through (to some degree) the particular gases in chambers 108 and are received by IR camera 102 during the calibration process (e.g., as described in reference to flowchart 200).

Additionally in accordance with an embodiment, a heater 404 may be provided as part of calibration vessel 400 (or heat may be provided to calibration vessel 400) to increase the temperature of surface 406 to provide stronger IR emissions (e.g., and increase gray level variation among chambers 108), as would be understood by one skilled in the art. Alternatively in accordance with an embodiment, calibration vessel 400 may include IR passband window 402 affixed to a front surface (as shown and discussed) and another IR passband window 402 affixed (e.g., in a similar fashion) to a rear surface of calibration vessel 400.

For example, rather than have the black anodized rear inner surface 406, the additional IR passband window 402 may be used to allow IR emissions to pass completely through calibration vessel 400. Thus for example, an IR source may be positioned on one side of calibration vessel 400 to provide IR emissions through calibration vessel 400 to IR camera 102 positioned on the other side of calibration vessel 400 to perform a calibration process as discussed herein. The IR source, for example, may provide a source having a selectable temperature to provide the desired IR emissions, which would be received by IR camera 102 after passing through calibration vessel 400, as would be understood by one skilled in the art.

Additionally, calibration vessel 400 may include one or more pedestals 408, which may support calibration vessel 400 when placed on a surface. For example, pedestals 408 may be situated on calibration vessel 400 such that, when supporting calibration vessel 400 on a surface, a certain chamber 108 (e.g., chamber 108(1)) is orientated in a proper position relative to video overlay 112 (e.g., a defined orientation). Alternatively pedestals 408 or other indicia may be provided on calibration vessel 400 to indicate proper orientation (e.g., up, left side, bottom, etc.) for imaging by infrared camera 102 (e.g., to provide an image corresponding to video overlay 112). Pedestals 408 may also be used, for example, to seal chambers 108 after filling with the desired concentration of gas.

For example in accordance with an embodiment, FIG. 4b illustrates display 106 having video image 110 orientated properly relative to video overlay 112. In this example, due to the proper orientation of calibration vessel 400, video overlay sections 112(1) through 112(6) are positioned next to corresponding video images 110(1) through 110(6) that correspond to chambers 108(1) through 108(6), which may aid a user during the calibration process.

As noted herein, video overlay 112 and calibration vessel 104 (e.g., and chambers 108) may be of any desired shape, size, or configuration. For example, FIG. 4c illustrates display 106 having video image 110 and video overlay 112 in accordance with an embodiment. In this example implementation, calibration vessel 104 or at least chambers 108 are square or rectangular in shape and aligned in a straight rather than circular pattern, with only four chambers 108 based on video images 110(1) through 110(4). Video overlay 112 provides four video overlay sections 112(1) through 112(4) corresponding to video images 110(1) through 110(4). In this example, video overlay 112 also includes a label region 420, which may provide various information to the user, such as the type of gas, gas concentration, corresponding IR camera (e.g., if video overlay is not stored in IR camera), and/or corresponding calibration vessel suitable to use with the particular video overlay 112. Furthermore, the calibration vessel may further include a label region, such as label region 410 on calibration vessel 400 (FIG. 4a) that provides various information to the user (e.g., corresponding information such as the type of gas, gas concentration, corresponding video overlay 112, and/or corresponding IR camera suitable to use with the particular calibration vessel.

Systems and methods are disclosed herein to provide infrared camera systems and infrared camera calibration techniques in accordance with one or more embodiments of the present invention. For example in accordance with an embodiment, an infrared camera calibration technique is disclosed that allows a user to calibrate an infrared camera (e.g., in the field) with a known gas concentration before field deployment or use for the desired infrared camera application. Consequently for example, the user via the calibration process has verified that the infrared camera is properly calibrated for that immediate application and is capable of detecting specific concentrations of the gas or gases of interest.

Embodiments described above illustrate but do not limit the invention. It should also be understood that numerous modifications and variations are possible in accordance with the principles of the present invention. Accordingly, the scope of the invention is defined only by the following claims.

What is claimed is:

1. An infrared camera system comprising:
   an infrared camera adapted to provide infrared image data and having adjustable camera settings;
   a display, coupled to the infrared camera, adapted to receive the infrared image data;
   a calibration vessel having chambers containing different concentrations of a gas, wherein the calibration vessel is external to the infrared camera; and
   a video overlay having sections corresponding to the chambers, wherein the sections provide proper colors for calibrating the infrared camera to detect the different concentrations of the gas by adjusting the camera settings such that colors of the infrared image data from the infrared camera of the chambers containing the different concentrations of the gas as shown on the display approximately match the proper colors of the corresponding sections.

2. The system of claim 1, wherein the camera settings comprise a gain and a level, and the colors of the video overlay represent predetermined infrared absorption levels corresponding to the different concentrations of the gas.

3. The system of claim 1, wherein the calibration vessel further comprises another chamber with a second gas different than the gas, the second gas providing a reference for the calibration of the infrared camera relative to the corresponding section of the video overlay.

4. The system of claim 1, further comprising an infrared source, and wherein the calibration vessel includes infrared passband windows adapted to allow infrared radiation from the infrared source to pass through the chambers to the infrared camera.

5. The system of claim 1, wherein the video overlay is stored in the infrared camera and adapted to be shown on the display.

6. A calibration vessel comprising:
   a housing;
   a plurality of chambers within the housing, wherein the chambers contain a gas, with each chamber having a different concentration of the gas;
   an infrared passband window, coupled to the housing, adapted to allow infrared radiation traveling through the chambers to be received by an infrared camera external to the calibration vessel, wherein the calibration vessel serves as a calibration tool for the infrared camera to detect the different concentrations of the gas within the chambers; and
   a reference chamber within the housing, wherein the reference chamber contains a second gas different from the gas, wherein the second gas provides a reference when the calibration vessel is used as the calibration tool for the infrared camera.

7. The calibration vessel of claim 6, wherein the infrared camera is calibrated by receiving the infrared radiation which traveled through the chambers and the infrared passband window and adjusting a gain and a level of the infrared camera such that displayed infrared images of the chambers as provided by the infrared camera match predetermined colors of a video overlay corresponding to the different concentrations of the gas within the calibration vessel, wherein the colors represent infrared absorption levels corresponding to the different concentrations of the gas.

8. The calibration vessel of claim 6, further comprising a label region on the housing, wherein the label regions provide information comprising a gas type, a gas concentration, and/or a corresponding video overlay description.

9. The calibration vessel of claim 6, further comprising indicia on the housing indicating proper orientation of the calibration vessel when used as a calibration tool for the infrared camera.

10. The calibration vessel of claim 6, wherein the calibration vessel forms one part of a calibration tool system, wherein the calibration tool system further comprises a video overlay corresponding to the calibration vessel and having video overlay sections corresponding to the chambers which provide proper colors for calibrating the infrared camera to detect the different concentrations of the gas based on camera setting adjustments such that colors of video images from the infrared camera of the chambers containing the different concentrations of the gas approximately match the proper colors of the corresponding video overlay sections.

11. A method of calibrating an infrared camera, the method comprising:
    capturing video images of a calibration vessel having chambers filled with different concentrations of a gas, wherein the calibration vessel is external to the infrared camera;
    displaying the video images from the capturing; and
    adjusting settings of the infrared camera such that colors of the displayed video images of the chambers corresponding to the different concentrations of the gas approximately match predetermined colors of corresponding sections of a video overlay to calibrate the infrared camera to detect the different concentrations of the gas.

12. The method of claim 11, wherein the adjusting comprises adjusting a gain setting and a level setting of the infrared camera, and wherein the predetermined colors represent predetermined infrared absorption levels corresponding to the different concentrations of the gas.

13. The method of claim 11, further comprising orientating the calibration vessel such that the displayed video images of the chambers are aligned with the corresponding sections of the video overlay.

14. The method of claim 11, further comprising selecting the video overlay from among a plurality of video overlays, wherein the selected video overlay corresponds to the calibration vessel.

15. The method of claim 11, wherein the adjusting upon completion verifies that the infrared camera is calibrated to detect the gas.

16. The method of claim 11, further comprising:
    selecting the calibration vessel from among a plurality of the calibration vessels, wherein the calibrations vessels each contain different gases; and selecting the video overlay from among a plurality of video overlays, wherein the selected video overlay corresponds to the selected calibration vessel.

17. A method of making a calibration system for an infrared camera, the method comprising:

determining a sensitivity of the infrared camera to a particular gas;

creating a calibration vessel having a plurality of chambers; and filling the chambers with different concentrations of the particular gas, wherein the concentrations are based on the determining of the sensitivity of the infrared camera to the particular gas and are selected to provide discernible color differences when the calibration vessel, which is external to the infrared camera, is viewed with the infrared camera to aid in calibrating the infrared camera to the different concentrations of the particular gas.

18. The method of claim 17, further comprising creating a video overlay corresponding to the calibration vessel, wherein the video overlay includes video overlay sections corresponding to the chambers, with the video overlay sections having predetermined colors for calibrating the infrared camera when viewing the chambers.

19. The method of claim 18, further comprising filling one of the chambers with a different gas for use as a calibration reference, wherein the video overlay includes a video overlay section corresponding to the chamber with the different gas, and wherein the predetermined colors represent predetermined infrared absorption levels corresponding to the different concentrations of the particular gas.

20. An infrared camera comprising:

a housing;

an infrared detector coupled within the housing;

a memory coupled within the housing, the memory adapted to store a video overlay having colors corresponding to infrared absorption levels for different concentrations of a gas; and a display adapted to receive from the memory the video overlay for a user of the infrared camera to view along with infrared image data from the infrared detector of an external calibration vessel, relative to the infrared camera, containing chambers filled with different concentrations of the gas;

wherein setting adjustments of the infrared camera to approximately match colors of the displayed infrared image data of the calibration vessel to colors of the corresponding displayed video overlay calibrates the infrared camera to detect the different concentrations of the gas.

21. The infrared camera of claim 20, wherein the memory stores a plurality of the video overlays corresponding to a plurality of the calibration vessels for calibrating the infrared camera for corresponding gases.

22. The infrared camera of claim 20, further comprising:

user controls coupled to the housing adapted to provide user control of the setting adjustments, wherein the user controls comprise a gain setting adjustment and a level setting adjustment; and logic coupled within the housing and coupled to the infrared detector, the memory, the user controls, and the display.

* * * * *